No. 607,403. Patented July 12, 1898.
E. W. YOUNG.
PNEUMATIC TIRE.
(Application filed Aug. 20, 1895. Renewed Feb. 12, 1897.)
(No Model.) 2 Sheets—Sheet 1.
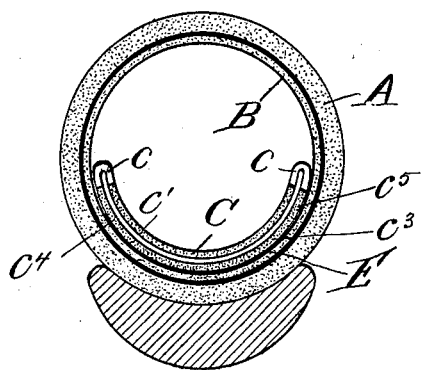
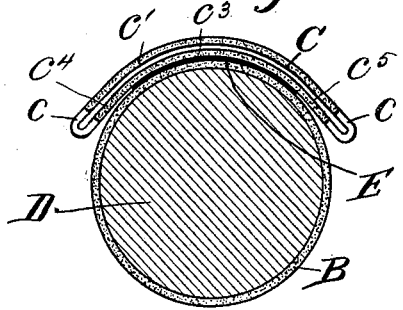
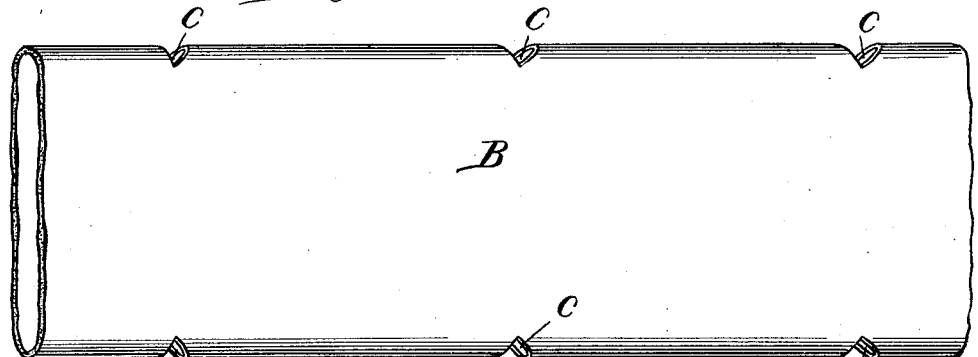
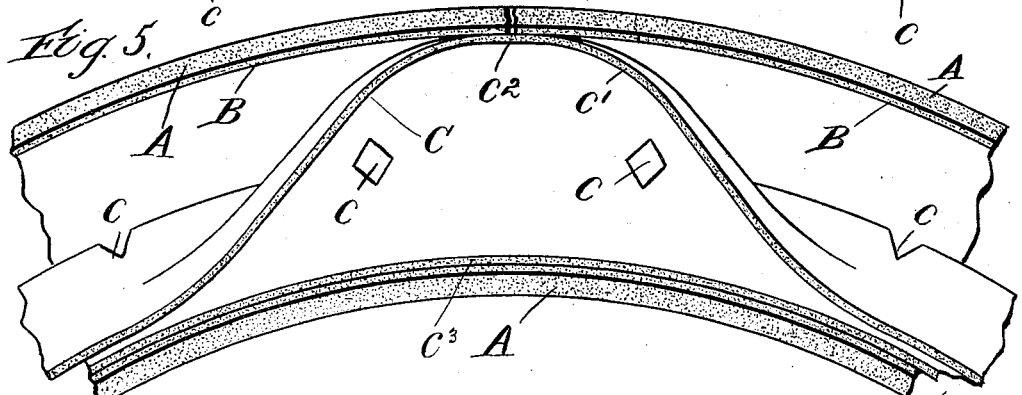
Witnesses:
A. H. Durand.
Margaret M. Wagner.
Inventor:
Ernest W. Young.
By Chas. S. Page, Atty.
THE NORRIS PETERS CO., PHOTO-LITHO., WASHINGTON, D. C.

No. 607,403. Patented July 12, 1898.
E. W. YOUNG.
PNEUMATIC TIRE.
(Application filed Aug. 20, 1895. Renewed Feb. 12, 1897.)
(No Model.) 2 Sheets—Sheet 2.
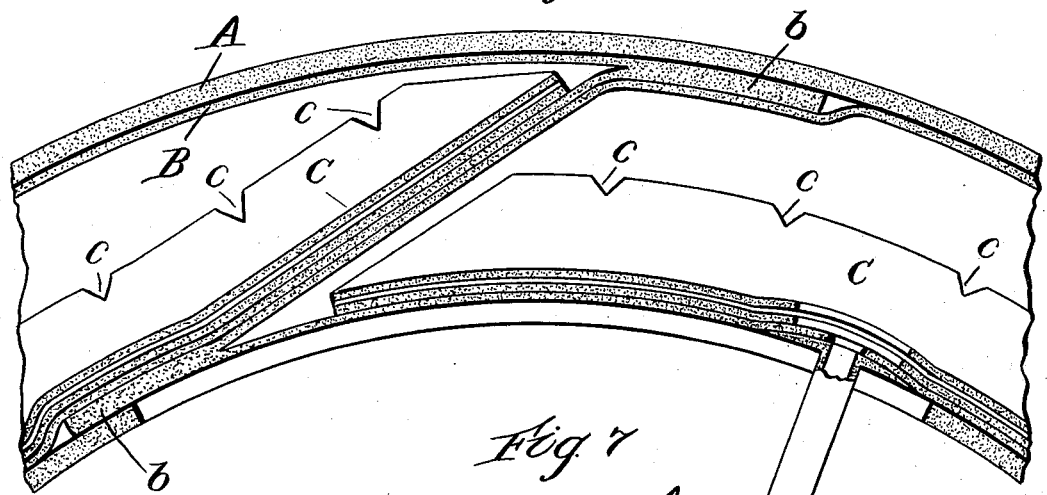
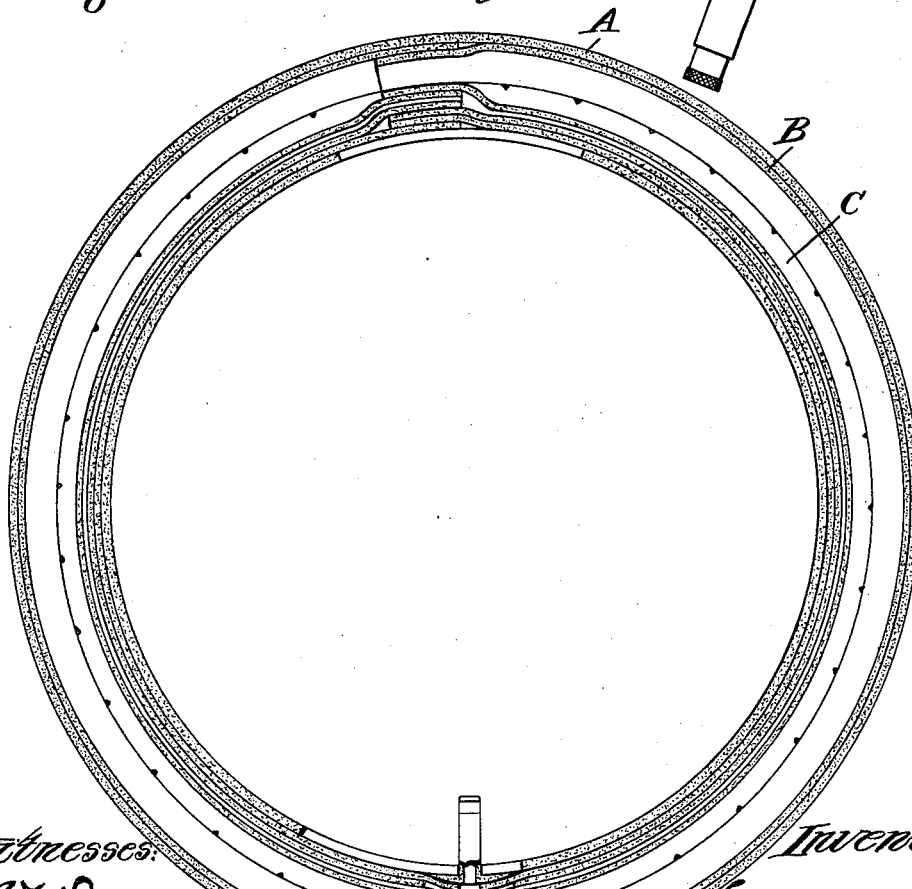

UNITED STATES PATENT OFFICE.

ERNEST W. YOUNG, OF AUSTIN, ILLINOIS, ASSIGNOR, BY MESNE ASSIGNMENTS, TO THE MORGAN & WRIGHT, OF CHICAGO, ILLINOIS.

PNEUMATIC TIRE.

SPECIFICATION forming part of Letters Patent No. 607,403, dated July 12, 1898.

Application filed August 20, 1895. Renewed February 12, 1897. Serial No. 623,196. (No model.)

*To all whom it may concern:*

Be it known that I, ERNEST W. YOUNG, a citizen of the United States, residing at Austin, in the county of Cook and State of Illinois, have invented a certain new and useful Improvement in Pneumatic Tires, of which the following is a specification.

My invention relates to pneumatic tires provided with internally-arranged patching fabric which can be cemented to punctured portions of the inner wall of the air-chamber as occasion may require.

Prior to my invention webs or plies of patching fabric for closing punctures have been attached to and extended from opposite side walls of the air-chamber, so as to lie opposite one another—as, for example, as shown in Letters Patent of the United States No. 495,777, dated April 18, 1893, in which each ply has a free longitudinal marginal portion, and in Letters Patent of the United States No. 527,097, dated October 9, 1894, in which the ply or plies is or are attached along both marginal portions to opposite side walls of the air-chamber.

My invention contemplates attaching the patching fabric to the inner face of the air-chamber along a middle line or central portion between opposite sides of such chamber, so as to leave free or unattached portions at opposite sides of the line of attachment. By such arrangement the free portions of the fabric can be extended and brought opposite the attached portion, so as to normally lie away from the tread portion of the tire and afford a suitable area of patching fabric which can be advantageously employed for patching punctured portions of the tire either along the middle of the tread portion or at opposite sides of such middle portion. The fabric can be easily, rapidly, and economically secured to the inner wall of the air-chamber, particularly where such inner wall is formed by the inner face or surface of an inner air-tube which is introduced into a sheath or casing. It also permits the patching fabric to be easily picked up when cemented to a punctured portion of the inner wall of the air-chamber and avoids any material resistance to its being thus picked up, it being observed that it is important to avoid resistance tending to tear away such newly-cemented portion of the patching-web. The arrangement also permits the inherent elasticity of a piece of rubber fabric to cause the patching portion of the fabric to normally lie adjacent to the base portion of the tire and at the same time to oppose its being picked up with what may be termed a "weak lazy-spring resistance," which is not sufficient to tear away such portion or portions as may be newly cemented to a punctured portion or portions of the wall of the air-chamber at the tread portion of the tire.

In the accompanying drawings, Figure 1 is a section taken transversely through a pneumatic tire embodying the principles of my invention. Fig. 2 is a section taken transversely through the air-tube on a mandrel and illustrates a way in which the repair or patching fabric can be conveniently applied to the tube. Fig. 3 is a section taken transversely through the inner tube and patching fabric, the tube having been turned so as to bring the patching fabric inside of the tube. Fig. 4 is a plan view showing the patching fabric made up as a tube. Fig. 5 is a section taken longitudinally through a portion of the tire, with the repair or patching fabric picked up. Fig. 6 is a like section showing a way in which the patching fabric, made up as a tube, can terminate when the same is arranged within an inner air-tube having flattened ends which overlap its inflatable portions. Fig. 7 is a section on a smaller scale through a pneumatic tire containing an air-tube having telescoped ends.

In said drawings the double-tube tire illustrated comprises a sheath or casing A and a separately-made inner air-tube B, it being generally understood that in a single-tube tire the lining thereof corresponds with the inner air-tube of a double-tube tire.

The repair fabric C may be of any impervious material suitable for patching, it being preferably of rubber or rubber compound. A portion $c^3$ of the fabric is secured by cementation or the like to the inner face or wall of the air-chamber, which in a double-tube tire is provided by the inner air-tube, the cementation of such fabric being indicated by the heavy black line E. This cementation or securement of the fabric is along the middle or central surface portion, extending longitudinally between opposite sides of the tire, it being understood that the term "sides of the tire" is used in contradistinction to the the tread and base portions thereof. By such arrangement the fabric, which has a part of its width secured to the tire, also extends both ways from such secured part, and thereby provides at opposite sides thereof free or unattached fabric portions which can be carried opposite the secured fabric portion, so as to provide a suitable area of free patching fabric $c'$, which can be picked up and used for patching and which can normally lie adjacent to the base of the tire.

When the fabric is picked up for patching, it will readily flex or yield and will also accommodate itself to the location of the puncture, which may be at either side of the middle line of the tread, it being seen that the patching portion $c'$ is practically free along what are in effect its longitudinal marginal portions, since such fabric portion is not secured to the tire, but is connected with the secured part of the fabric portion $c^3$ by free and flexible intervening fabric portions $c^4 c^5$, which serve as long flexible and desirably lazy-spring hinge connections. In patching, therefore, the fabric portion $c'$ when picked up may take up more or less of either or both of the portions $c^4 c^5$, according to the location of the puncture to be patched, and at the same time the permanent securement of the fabric portion $c^3$ to the tire will prevent lateral displacement of the fabric.

In Fig. 5 the puncture is along the middle line of the tread; but where the puncture is at one side of such middle line the portions $c' c^4$ or the portions $c' c^5$ of the cemented fabric at one or the other side of the cemented fabric portion $c^3$ provide ample area of slack fabric to accommodate patching at such point, according to the location of the puncture at one or the other side of the middle line of the tread portion of the tire, and thereby avoid strain on the newly-cemented patching portion of the fabric. Thus, for example, if in Fig. 1 the puncture is to the right of a line along the middle of the tread and the fabric portion $c'$ is picked up to close such puncture it will when picked up also draw up the fabric portion $c^4$, which is a continuation of the fabric portion $c'$. In this way the fabric has a desirably large range of service, since it can be used for closing side as well as middle punctures.

When the patching fabric is cemented to and picked up by a punctured portion of the wall of the air-chamber adjacent to the tread portion of the tire, air-spaces will of course exist at opposite sides of so much of the raised portion of the fabric as is not thus cemented as a patch to the punctured part of the tire, and to permit free communication between such spaces, so that the newly-cemented patch, as at $c^2$, Fig. 5, will not be forced from its adherence to the inner wall when the tire is inflated, suitable air passage or passages can be provided in any known or suitable way—for example, by cuts or gaps through the fabric or by any other suitable separation through any desired portion of the fabric—it being understood that I do not limit myself to any special arrangement or means for establishing communication between such spaces and that I may avail myself of any methods found in the prior art.

As a matter of further improvement the fabric can as a whole normally lie adjacent to the base portion of the tire and be in part secured centrally along the middle line of the inner face of such base portion of the tire, so as to avoid thickening up the tread portion of the tire, and as a matter of still further improvement the fabric can be turned out in tubular form, in which case the patching-tube thus provided may internally communicate with the air-chamber in any suitable way—as, for example, it can be provided with slits or gaps, as at $c$, or elsewhere. When thus primarily made in tube form, it can be vulcanized in a flattened condition if made of rubber, although, as it is necessarily comparatively thin, it will, however, when vulcanized readily accommodate itself to circumstances when brought within the air-chamber, and when secured between its free portion, as illustrated, the portions employed for patching will lie free and be at all times ready for service. When thus made as a tube, the illustrated mode of attaching the fabric which forms such tube will still afford a patching fabric attached along a middle line between the sides of the tire and having free or unattached portions at opposite sides of line and extended and carried opposite the secured portion. My invention, however, while comprising such special arrangement, also broadly comprehends a pneumatic tire having its air-chamber provided internally with patching fabric partially free and partially attached to the inner wall of the air-chamber along a middle line or portion between the sides of the tire and permitting in any known or suitable way the free communication between air-spaces at opposite sides of its free portions, the fabric being extended transversely both ways from its attached portion and having these extended portions free and carried opposite its attached portion, so as to provide a suitable area of normally smooth patching fabric which normally lies adjacent to the base side of the tire and which can be from time to time, as occasion may require, cemented to and freely picked up by a punctured portion of the wall of the air-chamber at the tread side of the tire, and thereby used for patching.

The foregoing-described improvements can be applied to single-tube or hose-pipe tires and also to double-tube tires. When employed in double-tube tires, the inner air-tube can be distended on a mandrel D, and the patching fabric can then be readily cemented to the air-tube, after which the air-tube can be removed from the mandrel and turned inside out, so as to bring the patching fabric within the air-chamber.

What I claim as my invention is—

1. A pneumatic tire containing a patching fabric having opposite side portions accessible to the interior of the air-chamber, the patching fabric being attached to the inner wall of the air-chamber along a longitudinal line between opposite sides of the tire, leaving on each side of said line of attachment a free unattached portion which extends opposite to and normally away from the tread side of the tire in position to be met by said tread side when the latter is depressed, and of such dimensions as to afford the slack requisite to permit it to be picked up by and carried back with the tread side of the tire when the latter is again expanded.

2. A pneumatic tire provided with internally-arranged patching fabric made up as a tube adapted to communicate with the air-chamber and secured to the inner wall of the latter along a line between opposite sides of the tire, the fabric thus secured, having free portions at opposite sides of the line of securement, and having opposite sides accessible to the interior of the air-chamber.

3. A pneumatic tire provided with an internally-arranged patching fabric made up as a tube adapted to communicate with the air-chamber and normally in a flattened condition regardless of the inflation of the tire, said tube being secured to the inner wall of the air-chamber at the base portion of the tire and having free marginal portions, through which air-passages are provided.

ERNEST W. YOUNG.

Witnesses:
A. F. DURAND,
MARGARET M. WAGNER.